United States Patent
Gilson

(10) Patent No.: US 11,736,406 B2
(45) Date of Patent: Aug. 22, 2023

(54) ASSURED RELATED PACKET TRANSMISSION, DELIVERY AND PROCESSING

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/827,480

(22) Filed: Nov. 30, 2017

(65) Prior Publication Data

US 2019/0166057 A1 May 30, 2019

(51) Int. Cl.
*H04L 47/10* (2022.01)
*H04L 47/12* (2022.01)
(Continued)

(52) U.S. Cl.
CPC .............. *H04L 47/29* (2013.01); *H04L 47/12* (2013.01); *H04L 47/2416* (2013.01);
(Continued)

(58) Field of Classification Search
CPC ..... H04L 47/29; H04L 47/2416; H04L 47/12; H04L 47/32; H04L 65/60; H04L 65/80; H04N 21/6479
See application file for complete search history.

(56) References Cited

U.S. PATENT DOCUMENTS 5,629,936 A 5/1997 Lee et al.
6,262,776 B1 * 7/2001 Griffits ................ H04N 5/4401
348/512
(Continued)

FOREIGN PATENT DOCUMENTS

EP 3343833 A1 * 7/2018 ........... H04L 12/185
WO WO 2010068600 A2 6/2010

OTHER PUBLICATIONS

Chebrolu K, Rao RR. Selective frame discard for interactive video. In2004 IEEE International Conference on Communications (IEEE Cat. No. 04CH37577) Jun. 20, 2004 (vol. 7, pp. 4097-4102). IEEE. (Year: 2004).*

(Continued)

*Primary Examiner* — Ayaz R Sheikh
*Assistant Examiner* — Tarell A Hampton
(74) *Attorney, Agent, or Firm* — BakerHostetler

(57) ABSTRACT

Systems and methods to enable grouping and routing of data packets are disclosed. Packets that together make up a data or content item may include grouping information that identifies or classifies the packets into a group. Grouping information may further contain information regarding maximum packet drop thresholds and instructions for a network device to follow if such a threshold is approached or exceeded. Network devices may receive and process the grouping information associated with packet groups and act in accordance with any given instructions. Network devices may intelligently decide to drop packets of one group to meet delivery thresholds for another group, including dropping all packets if necessary, or drop packets from several groups to meet delivery thresholds for all received groups. Network devices may notify other network devices about dropped packets and packet groups.

24 Claims, 12 Drawing Sheets

(51) Int. Cl.
  *H04L 47/2416* (2022.01)
  *H04L 65/80* (2022.01)
  *H04L 65/1069* (2022.01)
  *H04L 65/75* (2022.01)
  *H04N 21/647* (2011.01)
  *H04L 65/60* (2022.01)
  *H04L 47/32* (2022.01)

(52) U.S. Cl.
  CPC .......... *H04L 65/1069* (2013.01); *H04L 65/75* (2022.05); *H04L 65/80* (2013.01); *H04L 47/32* (2013.01); *H04L 65/60* (2013.01); *H04N 21/64792* (2013.01)

(56) References Cited

U.S. PATENT DOCUMENTS

| | | | | |
|---|---|---|---|---|
| 6,449,255 B1* | 9/2002 | Waclawsky | ............ | H04L 29/06 370/236 |
| 6,765,864 B1* | 7/2004 | Natarajan | ............... | H04L 41/06 370/224 |
| 6,822,940 B1* | 11/2004 | Zavalkovsky | .......... | H04L 47/10 370/235 |
| 6,847,653 B1* | 1/2005 | Smiroldo | ............. | H04W 74/02 370/403 |
| 6,922,396 B1* | 7/2005 | Knappe | .................. | H04L 47/10 370/252 |
| 8,213,453 B1* | 7/2012 | Voruganti | ............... | H04L 47/32 370/235 |
| 9,013,995 B2 | 4/2015 | Beheshti-Zavareh et al. | | |
| 9,197,562 B2 | 11/2015 | Beheshti-Zavareh et al. | | |
| 2002/0003777 A1* | 1/2002 | Miyamoto | ............. | H04L 29/06 370/236 |
| 2003/0026205 A1* | 2/2003 | Mullendore | ............ | H04L 47/29 370/230 |
| 2003/0119556 A1* | 6/2003 | Khan | ....................... | H04L 47/14 455/560 |
| 2003/0179703 A1* | 9/2003 | Levy | ....................... | H04L 41/06 370/230 |
| 2003/0195977 A1* | 10/2003 | Liu | ................... | H04L 29/06027 709/231 |
| 2004/0001436 A1* | 1/2004 | Cuffaro | ................. | H04L 1/1628 370/230 |
| 2004/0039832 A1* | 2/2004 | Hidaka | ............... | H04L 12/4666 709/230 |
| 2004/0125815 A1* | 7/2004 | Shimazu | ................. | H04L 47/10 370/411 |
| 2004/0174892 A1* | 9/2004 | Jeong | ..................... | H04L 47/10 370/412 |
| 2005/0281204 A1* | 12/2005 | Karol | ..................... | H04L 43/50 370/252 |
| 2006/0209853 A1* | 9/2006 | Hidaka | .................. | H04L 47/10 370/401 |
| 2007/0237074 A1 | 10/2007 | Curry | | |
| 2007/0261082 A1* | 11/2007 | Ji | ....................... | H04N 21/2662 725/62 |
| 2008/0008093 A1* | 1/2008 | Wang | ..................... | H04L 47/10 370/235 |
| 2008/0019274 A1* | 1/2008 | Droux | ..................... | H04L 12/42 370/235 |
| 2008/0095247 A1* | 4/2008 | Ohno | ................... | H04L 1/0019 375/240.28 |
| 2008/0288628 A1* | 11/2008 | Starr | ...................... | H04L 67/20 709/224 |
| 2010/0232370 A1* | 9/2010 | Jing | ..................... | H04L 47/2441 370/329 |
| 2010/0323746 A1* | 12/2010 | Zhang | ................ | H04W 52/225 455/522 |
| 2011/0044168 A1* | 2/2011 | N Das | .................. | H04L 1/0002 370/232 |
| 2011/0211450 A1* | 9/2011 | Meloche | ............. | H04L 41/5025 370/235 |
| 2012/0106669 A1* | 5/2012 | Rao | ...................... | H04N 19/172 375/295 |
| 2012/0195201 A1* | 8/2012 | Ishikawa | ............ | H04L 41/0896 370/235.1 |
| 2012/0224480 A1* | 9/2012 | Nakash | ................... | H04L 47/12 370/230 |
| 2014/0115145 A1* | 4/2014 | Monk | ....................... | H04L 43/04 709/224 |
| 2014/0115406 A1* | 4/2014 | Agrawal | ................ | H04L 67/06 714/47.1 |
| 2014/0269378 A1 | 9/2014 | Holbrook et al. | | |
| 2014/0313989 A1* | 10/2014 | Doken | ................. | H04L 65/605 370/329 |
| 2016/0100230 A1* | 4/2016 | Ma | .................... | H04N 21/44209 725/109 |
| 2016/0323116 A1* | 11/2016 | Garofalo | ............ | H04L 12/1868 |
| 2017/0041238 A1* | 2/2017 | Do | ....................... | H04L 1/0014 |
| 2017/0142029 A1* | 5/2017 | Xia | ....................... | H04L 47/11 |
| 2018/0048567 A1* | 2/2018 | Ignatchenko | ....... | H04L 45/3065 |
| 2018/0054346 A1* | 2/2018 | Hambridge | ........... | H04L 41/048 |

OTHER PUBLICATIONS

Huo L, Fu Q, Zou Y, Gao W. Network adapted selective frame-dropping algorithm for streaming media. IEEE Transactions on Consumer Electronics. Jul. 9, 2007;53(2):417-23. (Year: 2007).*

* cited by examiner

ASSURED RELATED PACKET TRANSMISSION, DELIVERY AND PROCESSING

BACKGROUND

In computer networks, packets are used to transmit data between network devices. A packet acts as a data container and may be transmitted between network devices to convey information. Information, e.g., media streams and data files, at an endpoint device may be broken down into segments and encapsulated into packets for sending to users at receiving devices. For example, a frame of a video stream may be broken into several packets at a sending device and reassembled by a receiving device. Network devices may be connected via a network, such as a local WiFi network in a single home or a large public network such as the Internet. During transmission of packets between endpoint devices, one or more routers may be used to process and direct packets through the network. With large networks having a myriad of network devices, millions of packets may be in transit at any one time. Large numbers of packets being transmitted through a single router may lead to packet traffic congestion if the router is not able to process the packets quickly enough. If congestion occurs and a router becomes overburdened, the router may drop packets. Dropping packets from a data stream may result in not only losing the data within the packets, but also making other information contained in the data stream inaccessible.

In existing networks, when a congested router determines to drop packets, typically no consideration is given to packets cross-referencing or relying upon other packets; thus, dropped packets may be randomly selected by the router. Random selection of packets for dropping may distort delivered data content for multiple recipient devices. For example, if packets are dropped from a stream of packets containing video content ("video stream"), the video, or portions thereof, may be distorted or not capable of reassembly upon delivery. If packets are dropped from each of several video streams delivered to multiple recipients, each recipient's video may be distorted or not capable of reassembly upon delivery.

SUMMARY

Systems and methods are described to enable the grouping of packets in a way that addresses shortcomings in the art, including dropping of related packets. Packets that together make up a data or content item, such as packets that are part of a stream or data file, may include grouping information that identifies or classifies the packets into a group. Grouping information may further contain information regarding maximum packet drop thresholds and instructions for a router to follow if such a threshold is approached or exceeded. Systems and methods disclosed herein enable router-awareness of packet groups. Routers may receive or access, and process, the grouping information associated with packet groups and act in accordance with a packet group's associated instructions. Based upon the grouping information associated with packets, a router may decide, for example, to drop packets of one group in order to meet delivery thresholds for another group based on various criteria. In another example, a router may determine to drop packets from several groups in order to meet delivery thresholds for all received groups. A router may also notify upstream senders, downstream receivers, and other network components, about dropped packets and groups.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION

Figure 1:
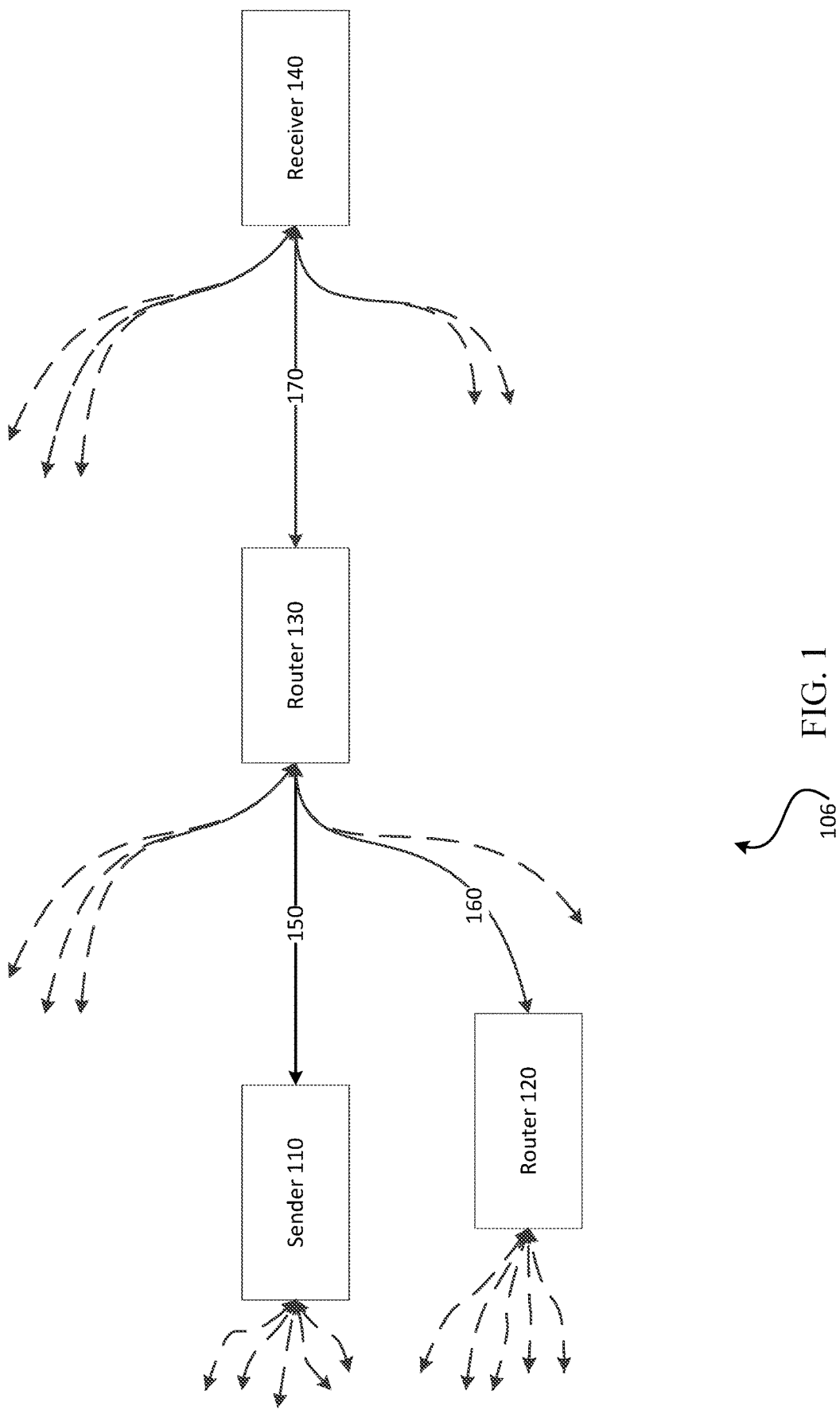
FIG. 1 depicts an example communication network.

In computer networks, data is transmitted from a sender device to a receiver device over a network that both are connected to. The network may be any size, ranging from a small, local WiFi network in a single home, to a large, public network like the Internet. Any number of network devices may be used to connect the sender and receiver to facilitate transferring of data. For example, a sender may be connected to a router, which is connected to a network extender, which is connected to a receiver, and data may travel from the sender through the router and network extender to arrive at the receiver. The network devices need not be limited to routers or network extenders, but for ease of description, network devices will be referred to hereinafter as "routers." To facilitate data transfers between the sender and receiver, the data may be broken into small pieces, with one or more pieces each placed into a data container or data structure before sending. An example of such a data container or structure is an Internet Protocol (IP) packet, each of which comprises a header and a payload, the header carrying identifying information about the packet and payload, and the payload carrying one or more of the small pieces of data. The data containers or structures need not be limited to IP packets, but for ease of description, these data containers or structures will be referred to hereinafter as "packets." Routers may use a header portion of a packet to direct the packet through a network. Unless routers are performing specific tasks or specific processing for a network or application, routers typically may not access data contained in the payload portion of a packet. Data in the payload portion of a packet may typically be used by one or more applications on a user device and so may have little to no relevance to routing the packet through a network.

Routers may be able to determine the type or content of data in a payload portion of a packet by using a process called deep packet inspection (DPI). DPI may add functionality to routers by enabling routers to determine actions or instructions based on the content of a packet. For example, DPI may enable a router to determine if a packet includes a virus or spam that could harm an end user or network. In another example, DPI may enable a router to prioritize packets based on a quality of service preference by determining the type and/or content of data carried by those packets. While DPI may be useful, the use of DPI may require a router to spend more time processing a packet than the router normally would because the router must determine the contents of each packet before transmitting the packet downstream through the network.

Data may be consumed by a user based on streams of packets. For example, a single packet may not be able to contain a full frame of video, so multiple packets may be needed to contain the information for a single frame, and multiple frames may require a continuous stream of packets (a "video stream") to deliver video content to a user. A video stream may comprise different types of packets, typically "key frames" or "iframes," and differential frames or packets (collectively, "differential data"). An iframe includes a large amount of picture data that is sent for key scene changes, and differential data includes changes that occur to the iframe. For example, on a news show with a reporter's talking head, an iframe may include the background and reporter's face and body, and differential data associated with that iframe may include the changes to the moving mouth and face of the reporter so that data containing the background and rest of the reporter will not need to be sent with each packet. If the camera cuts away, a new iframe may be sent having its own associated differential data. In this way, a video stream may be logically divided into subsets comprising iframes with differential data dependent on each iframe, and if an iframe is lost, then its associated differential data may become useless to the consumer because the consumer has no base iframe to make changes to, and playback will stop. Playback may properly resume upon reception of the next iframe. Differential data may also have its own differential data, creating a hierarchy where each deeper level of differential data is dependent on all levels before it. For example, a child differential data of a parent differential data is dependent upon the parent differential data as well as the parent iframe of the parent differential data. If the parent differential data is lost, then the child differential data becomes useless to the consumer.

Large amounts of data arriving at a single router may cause congestion. When network congestion occurs, packets may be dropped randomly at the point of congestion without regard to what information the dropped packets carry or how the dropped packets are related to other packets being transmitted. Packet-indifferent dropping processes may result in degraded user experiences. For example, if packets are dropped from a video stream, the video may be distorted or not capable of reassembly upon delivery. Further, if packets are dropped from each of several video streams delivered to multiple recipients, each recipient's video may be distorted or not capable of reassembly upon delivery.

In systems having quality of service (QoS) processing, certain types of packets may be delivered before, or in lieu of, other packets. However, packets of the same type may not be capable of prioritization or classification. For example, a QoS setting may prioritize packets containing voice data during a phone call over packets containing video data traffic, but multiple recipients of packets containing video data traffic may not be capable of prioritization over each other. If a router drops packets in this case, all recipients of the video data may suffer.

To account for a router's packet-dropping behavior, some network protocols may allow for the retransmission of dropped packets. However, retransmission of data leads to latency because the receiving network entity will not receive those dropped packets until the dropped packets travel through the network again. For applications relying on time-sensitive data transmission, such as the video stream example above, waiting for packets is not desirable to ensure proper user experience.

Systems and methods are described enabling the grouping of packets to assure delivery of at least a certain percentage of grouped data or packets. Packets that together make up a logical object, data item or content item, such as those that are part of a stream or data file, may include grouping information that identifies or classifies the packets into a group. Grouping information may further contain maximum packet-dropping thresholds and instructions, e.g., programming logic, for a router to follow if a threshold is exceeded. Systems and methods described herein enable router-awareness of one or more packet groups. Routers may receive and process grouping information associated with packet groups and act in accordance with a packet group's associated instructions. For example, a router, based upon grouping information associated with a group of packets, may determine to drop packets of one group in order to meet delivery thresholds for another group. Such an implementation is an improvement over a process where a router may drop packets from several groups, and thereby cause more than one group of packets to become deficient due to, for example, information lost in dropped packets. In another example, a router may determine to drop a determined number of packets from several groups to meet delivery thresholds for all received groups. Routers may also generate and transmit information that provides notice to other network devices about dropped packets and groups.

FIG. 1 illustrates an example network 106 through which data packets may be communicated. The example network 106 of FIG. 1 may be any that is suitable including, for example, all or part of a small, home network, all or part of a large network such as the Internet, or a combination of both. In the example network 106, a sender 110 is connected to a receiver 140 through a router 130, using connections 150 and 170, respectively. The sender 110 may be a provider of media, such as an Internet Service Provider (ISP), a user device, or another router on the network being used to transfer data to the receiver 140. Similarly, the receiver 140 may be a user device or a router. For example, the sender 110 and the receiver 140 may be laptop computers that may transmit data to each other via their respective connections to the router 130. A router 120 may also be connected to the router 130 using connection 160, and may be a sender of data or a router on a data path from a sender to the receiver 140. The connections 150, 160, and 170 may be physical connections, such as a LAN cable or fiber-optic cable, or wireless connections, such as those via WiFi or cellular. The connections 150, 160, and 170 may support data traveling in both the upstream direction, from the receiver 140, and downstream direction, to the receiver 140, as indicated by the arrows on both sides of the connections in FIG. 1. Each of the devices in the network may be connected to any number of other network devices via connections similar to connections 150, 160, and 170, as illustrated by the various dashed lines in FIG. 1.

In the example network 106 of FIG. 1, data may travel from the sender 110 through connection 150 to the router 130 and then through connection 170 to the receiver 140. Similarly, the router 120 may transmit data through connection 160 to the router 130 for delivery at the receiver 140 through connection 170. The router 130 may aggregate the received data from the sender 110 and the router 120 for transfer on connection 170 to the receiver 140. In some instances, the data received at the router 130 may be excessive, causing the router 130 to be a possible congestion point in the network.

The sender 110 may be configured, e.g., programmed, to generate, package, and transmit grouping and relational information with data packets in addition to any header and payload information the packets may have. The grouping information may comprise any suitable information. For example, and as is described in detail below, the grouping information may comprise group-identifying information, a maximum packet-dropping threshold, programming logic instructions for a receiving router or device to follow if the packet-dropping threshold is approached or exceeded, and other information relevant for processing. Downstream network devices, such as routers, may receive, process, and act upon this grouping information. Such downstream network devices may need to use DPI to access grouping information associated with a packet.

Figure 2A:
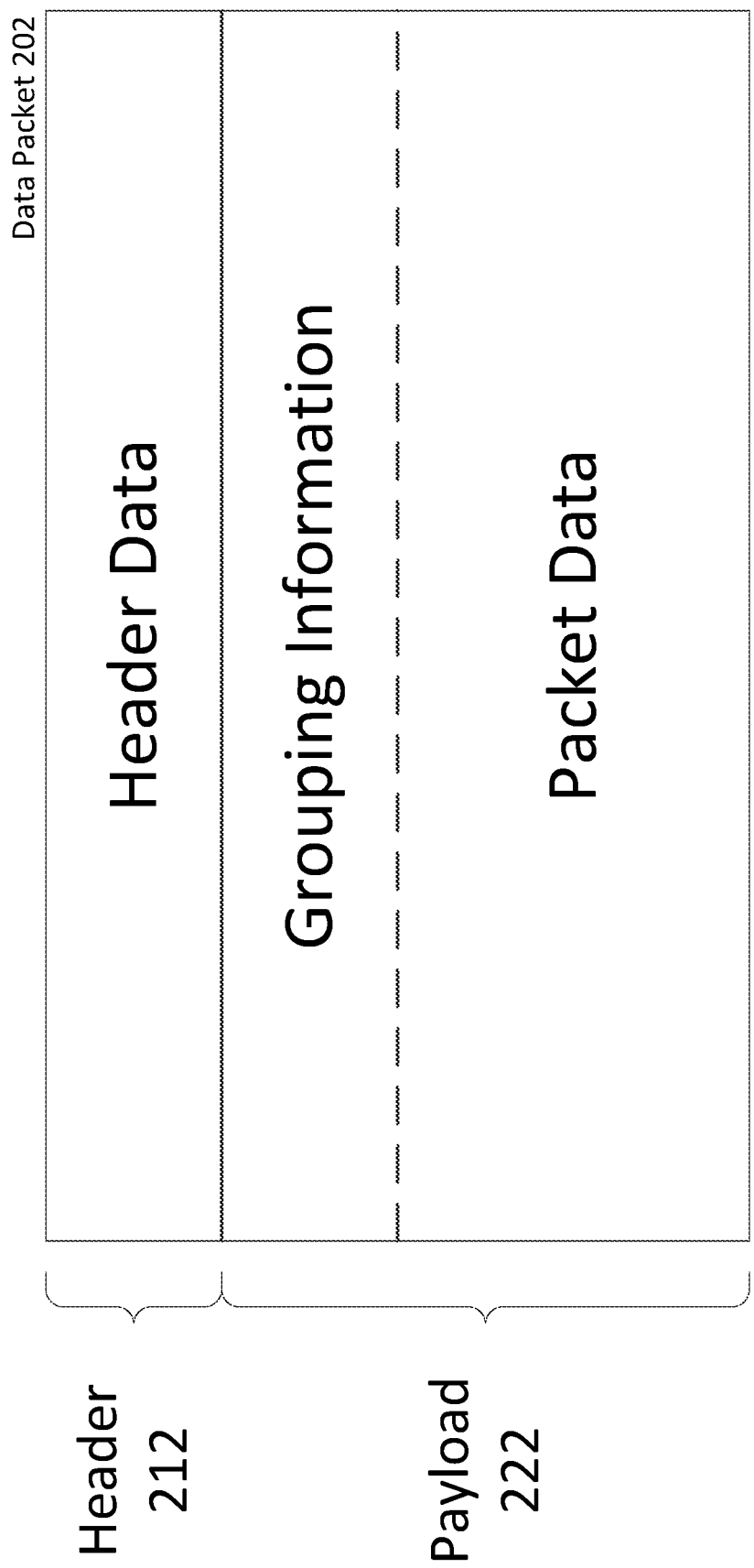
FIG. 2A illustrates an example of a data packet.
Figure 2B:
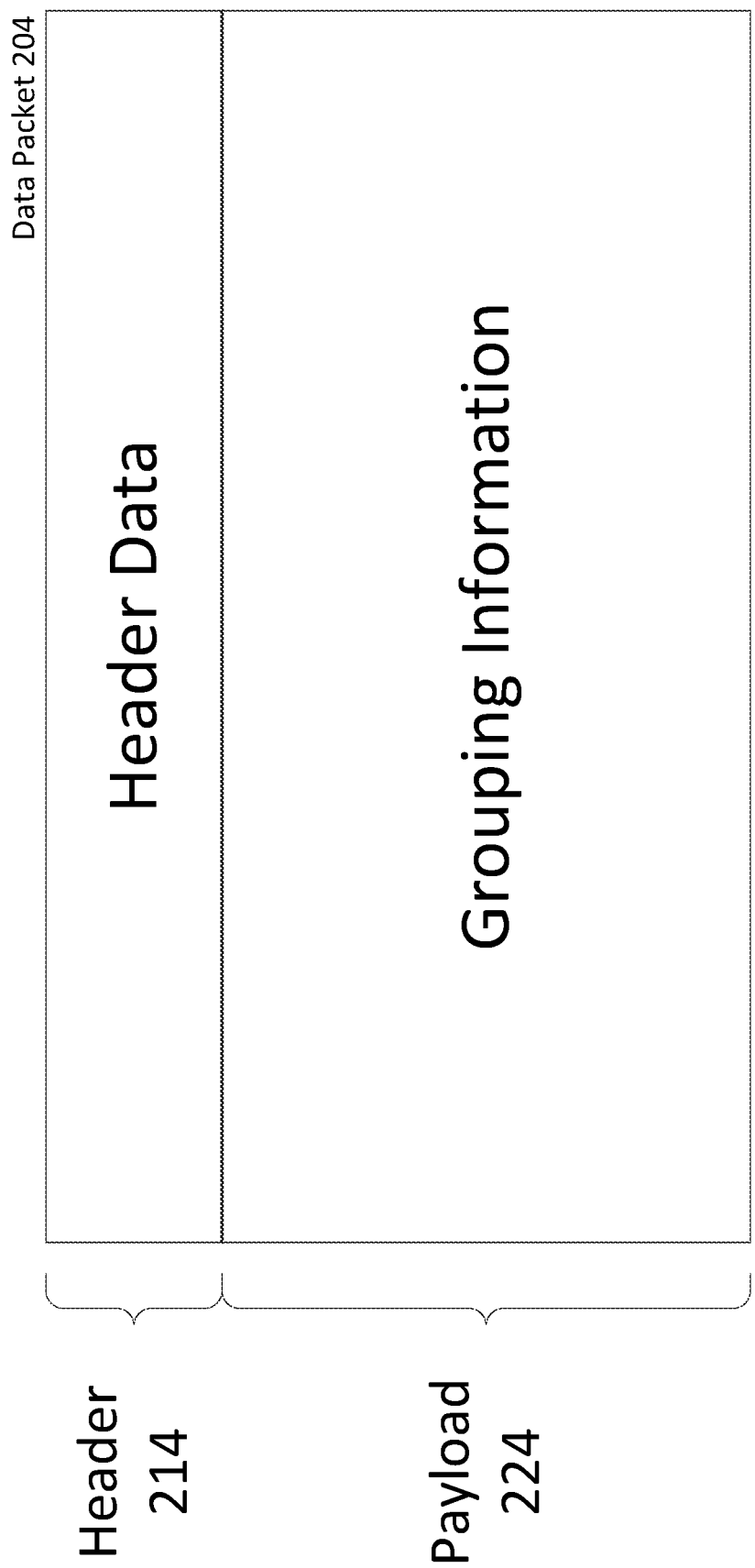
FIG. 2B illustrates another example of a data packet.
Figure 2C:
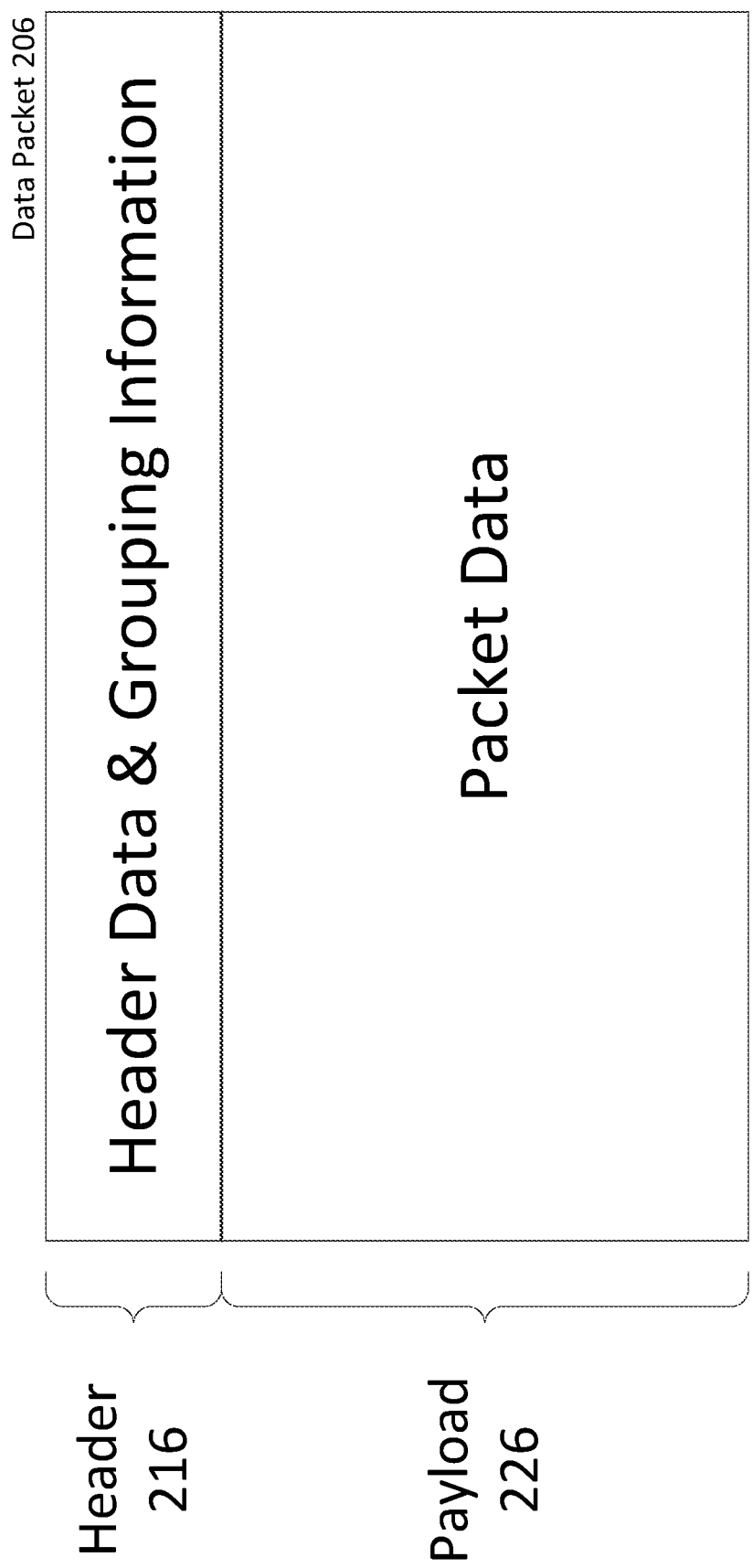
FIG. 2C illustrates yet another example of a data packet.

FIGS. 2A-2C illustrate examples of packets in which grouping information may be carried. FIG. 2A illustrates an example of a data packet that, for example, may be used to communicate grouping information in each packet of a stream. FIG. 2B illustrates an example of a data packet that, for example, may be used to communicate grouping information in each nth packet of a stream. FIG. 2C illustrates an example of another data packet that, for example, may be used to communicate grouping information in each packet of a stream, but may require the creation of a new type of data packet or a new header standard for existing types of packets.

FIG. 2A illustrates an example of a data packet 202, such as an IP packet, comprising a header portion 212 and a payload portion 222. In this example, the header portion 212 comprises typical header data found in existing data packets. However, the payload portion 222 comprises grouping information regarding one or more related packets in addition to a portion of the data being communicated over the network. Data being communicated over a network using a packet such as the data packet 202 may necessitate the use of more packets than in existing systems to account for the loss of storage space in the payload portion 222 of the packet. Further, group-aware routers using a packet such as the data packet 202 may need to have the ability to perform DPI in order to process the grouping information contained in the payload 222. Software applications may need to be programmed to determine where grouping information will be in the payload 222 and how any grouping information fields are defined so that the applications do not confuse the grouping information with application-specific data. Packets containing grouping information in the payload 222 may include a flag bit or byte indicating the packet has new grouping information. The flag bit or byte may be accompanied by a bit or byte length of the grouping information if no standard length is agreed upon.

FIG. 2B illustrates an example of a data packet 204, such as an IP packet, comprising a header portion 214 and a payload portion 224. In this example, the header portion 214 comprises typical header data found in existing data packets. However, the payload portion 224 comprises only grouping information. Because no packet data is included in the payload portion 224, use of packets such as the data packet 204 may need to be combined with one or more other types of packets to transmit data. Group-aware routers using a packet such as the data packet 204 may also need to have the ability to perform DPI in order to process the grouping information contained in the payload 224. Software applications may need to be programmed to ignore packets such as the data packet 204 so that the applications do not confuse the grouping information with application-specific data. In some scenarios, a router one network hop away from a receiver may consume or destroy such a packet to avoid sending the packet to an application that may mishandle the grouping information.

FIG. 2C illustrates an example of a data packet 206, such as an IP packet, comprising a header portion 216 and a payload portion 226. In this example, the header portion 216 comprises typical header data plus any grouping information. The payload portion 226 comprises packet data, as used in existing systems. Adding the grouping information to the header portion 216 may allow a router to process grouping information without needing to perform DPI, which may speed up processing when compared to packets such as the data packet 202 and the data packet 204. Additionally, software applications may not need to be programmed to ignore grouping information because the applications will likely not inspect the header portion 216 of received packets. Implementation of a packet such as the data packet 206 may require the creation of a new type of packet and/or packet standard to account for the addition of new header fields. New header fields may include a flag bit or byte with associated length, such as described with respect to FIG. 2A, above. Another new header field may include an identifier of a grouping information standard followed by a version number. The version number may indicate the length of grouping information and any other predefined fields so that group-aware routers and applications may properly process the grouping information included in the packet.

Grouping information may be associated with and communicated with the data packets in any suitable manner. For example, grouping information may be included with only the first packet of the group, every packet of the group, intermittently in packets throughout the group, or any combination thereof, and may involve one or more of the examples of packets illustrated in FIGS. 2A-2C.

In an example, the first data packet in a stream of packets may identify the entire group of packets. The first data packet may also identify the maximum packet-dropping threshold and instructions that downstream routers should follow in relation to the group of packets. In this example, the first data packet may be used to set up a connection session between a sender and a receiver. Existing protocols may use such a packet as part of a network handshake to notify the receiver that the sender is sending and to notify the sender that the receiver is receiving. Such a packet may be similar to the data packet 204 of FIG. 2B and include a network protocol and/or packet protocol with the grouping information in the payload of the packet so that both the sender and the receiver are using compatible data formats before any data is communicated. Because existing protocols may perform a connection session setup in this manner, using a first data packet to convey the grouping information may be more easily implemented for backward compatibility with non-group-aware systems and networks. Further, in this example, grouping information may not need to be carried with other packets because the first data packet may be processed by routers on the network path from the sender to the receiver as well as the receiver. An application on the receiver device using the network connection may ignore this first packet and not need to strip any grouping information out of future packets. Alternatively, a last router before the receiver may consume the grouping information so that the application at the receiver does not need to process and/or ignore it.

In another example, each packet that is part of a group of packets may include the grouping information. Such a scheme may involve one or more types of packets, such as those shown in FIGS. 2A and 2C. Having associated grouping information with each packet may enable the sending of multiple groups of packets simultaneously without the need for enumerating each group during a connection session setup. For example, a sender would like to send a receiver a group of packets, group 1. The connection may be established, and the sender and receiver may exchange information. During this exchange, the sender may like to send the receiver another group of packets, group 2. Instead of creating a new session, the sender may send group 2 over the same connection as group 1. Routers on the network may recognize the grouping information as each packet arrives and may process the packet accordingly, tracking and/or processing group 1 and group 2 separately.

A combination approach may also be used to transmit grouping information. The first packet of a stream may include all of the grouping information, and subsequent packets may include identifying information associating each particular packet with the group. Identifying information may include, for example, a group identifier, a sequence number of the packet in the group, or both.

In an example, every nth packet may include the grouping information. Such a scheme may use a combination of the above two examples or a variation of one or both of the above examples. An initial packet may identify grouping information pertaining to a particular stream. This packet may assist in connection session setup between a sender and a receiver. Periodic updates to this grouping information may be sent during transmission of the stream to indicate any changes made to the grouping information. Such updates may occur at fixed intervals or when grouping information changes. A scheme using periodic updates may use any combination of the packets illustrated in FIGS. 2A-C. For example, the first packet may be a data packet such as data packet 204, shown in FIG. 2B. Packets updating grouping information may be of the same type, or may be a data packet such as data packet 202 of FIG. 2A or data packet 206 of FIG. 2C. Any packet capable of sending grouping information may be used.

Packets may be grouped together, i.e., have grouping information classifying the packets into a certain group, based on any relevant identifying criteria. For example, packets may be grouped based upon content type, an assigned identifier, sending network device, priority, application-specific information, and any other criteria that may be useful for grouping. An example of grouping based upon content type may involve grouping video packets together separately from packets containing text. Grouping based upon an assigned identifier may involve grouping packets based on an identifier that may or may not be associated with the content; for example, an identifier may be a name like "Sesame Street," an assigned one like "Frame1" or "Video1," or even just a unique number. Grouping based on the sending network device may involve grouping packets based on the name or location of the sending device or provider, and may be useful, for example, in differentiating packets from a particular ISP, service or application from those of another ISP, service or application. For example, a group of packets may be identified as "Comcast ISP," "Netflix," "John Doe's Computer," "Content X" or "data group X." Additionally, a device or service may request a unique identifier from an upstream provider to use for its group identifier to ensure the identifier is unique on the network. For example, an application may request a grouping identifier from an ISP to ensure the identifier is unique on the ISP's network, assuming the ISP does not distribute duplicate identifiers. Priority-based grouping may group packets based on the importance of the packets to the sender or receiver, e.g., "High Priority," "Priority 1," etc., where the levels of priority, such as "high" or "1," refer to a predetermined priority hierarchy. Grouping based on application-specific information may involve grouping packets based on their use by a specific application. For example, a video conferencing application may use both video and audio packets and group such packets together under an "Application X" identifier.

Grouping information may include a maximum packet-dropping threshold, which may identify the maximum number or percentage of packets the group may be able to lose or the minimum number or percentage of packets of the group that must be delivered for proper user consumption. The thresholds may specify a total number of packets, a number of packets in a row, or both. For example, grouping information for a voice stream may have a 1% total drop threshold and a no-more-than-five-packets-in-a-row drop threshold so that large, consecutive segments of voice communication are not dropped.

Grouping information may also include associated programming logic instructions for a router, such as the router 130, to execute if a given threshold is reached or may be exceeded. For example, a video stream may be required to deliver at least 95% of the packets to a receiver 140 for uninterrupted playback to a user. In such an example, the grouping information for the group containing that video stream may comprise a maximum dropping threshold of 5% and instructions for a router 130 to drop a subset of the group comprising an iframe or a subset of the group comprising differential data, or the entire group, if the 5% threshold is exceeded. If a router 130 determines that more than 5% of the packets are lost during transmission from a sender 110 to the receiver 140, the router 130 may drop one or more iframe and differential data subsets of the group, and possibly the entire group, consistent with given instructions, as the video output, or sections of the video output, would be unacceptable to the consumer. Dropping may be for a specified period of time, until the next iframe arrives, or any other feasible manner. In another example, a congested router 130 receives two groups of data packets and identifies from the grouping information that one group has a 5% threshold and a second group has a 10% threshold. The congested router 130, using the grouping information, may begin to drop packets from the second group until the 10% threshold is reached and only then drop packets from the first group until the 5% threshold is reached. The grouping information may also instruct the router 130 to alternate dropping between groups incrementally. For example, the router 130 may be instructed to drop no more than 5% of the packets from the second group before beginning to drop no more than 5% of the packets from the first group before returning to drop another 5% of the packets from the second group. Such alternating may continue until either a dropping threshold is reached or the congestion dissipates enough for proper delivery. If the router 130 continues to be congested after dropping packets to meet the thresholds, it may need to completely drop one of the two groups to guarantee that at least one group is delivered within its required drop thresholds. Alternatively, before beginning to drop packets, the router 130 may determine that dropping the maximum amount of packets from each group will not allow the router 130 to decongest itself and may select a group to drop in its entirety, thus dropping one group and leaving another intact. Such instructions in the grouping information allow a router 130 to intelligently decongest itself without adversely affecting end users.

Grouping information may also include additional parameters that are useful for the router 130 when processing groups and determining which packets to drop. Additional parameters may include, for example: expected data rate; expected packet sizes; expected packet bursts or burstiness; type of stream; identification of packets of the stream that are safe to drop; data source and destination; expected time for which the stream will continue; and any other information relevant to a router's processing of packets. Such additional parameters may allow a router 130 to not only intelligently drop packets when congested, but also predict which packets it may need to drop in the future. For example, if a busy router 130 receives packets with grouping information indicating that an incoming video stream (1) will need half of the available bandwidth when being transmitted, (2) has large and small packet sizes with the small packets containing only descriptive information irrelevant for viewing, (3) will arrive in multiple bursts, and (4) continue for at least the next two minutes, the busy router 130 may determine to drop the already-arrived small packets to save bandwidth and determine to drop all future small packets of the stream for the next two minutes or until more bandwidth is available.

A group's information may indicate that the group is dependent on another group. For example, assume there are three groups of packets arriving at router 130, Group 1, Group 2, and Group 3, and all three groups' packets comprise the same video stream in different qualities. The three groups together may congest the router. Group 1 may have grouping information indicating that it is 1 megabit per second (mbps) data rate. Group 2 may have grouping information indicating that it is 3 mbps data rate and dependent on Group 1 because it builds upon Group 1's video stream to achieve the higher data rate. Group 3 may have grouping information indicating that it is 6 mbps data rate and dependent on Groups 1 and 2 because it builds upon both of their video streams. The router 130 may have stored thereon associated group-aware programming logic that allows it to process the grouping information and associate the groups with each other and appropriately corroborate dropping. If the router 130 becomes congested and must drop packets, the router determines based upon the grouping information that it should first drop packets of Group 3 because Group 3 is dependent on Groups 1 and 2, and no groups depend on Group 3. For the end user at the receiver 140, the quality of the video may drop, but the video will remain intact and viewable. Likewise, if the router 130 determines it must drop packets after Group 3 is dropped, the router may determine that Group 2 should be dropped before Group 1 because Group 2 is dependent on Group 1. Again, the user at the receiver 140 may experience a drop in quality, but the video will remain viewable.

Grouping information may be updated during the transmission of a packet stream. For example, if a video stream is nearing the end of its running time, a packet or packets may include updates to grouping information so the router 130 may determine it will soon have less congestion. Updates to grouping information may be delivered via any of the aforementioned methods and thus may be contained within a single packet or many. In embodiments, packets that update grouping information may specify information for only the parameters that need to be updated. In other embodiments, the prior grouping information is included with the updated grouping information. Updates may also be predictive, probabilistic, reaffirm the original grouping information, or any combination thereof. For example, a packet may include grouping information that informs the router 130 a parameter will change in five seconds. The grouping information may further inform the router 130 that, for example, there is a 50% chance a parameter may change in five seconds. Alternatively, or in addition, a packet may include grouping information that reaffirms the previous grouping information received by the router 130 and that specifies a time the group information is expected to be updated. For example, a packet may contain information affirming the current grouping parameters and also informing the router 130 to expect another packet with updated group information in a specified time interval such as, for example, ten milliseconds.

Figure 3:
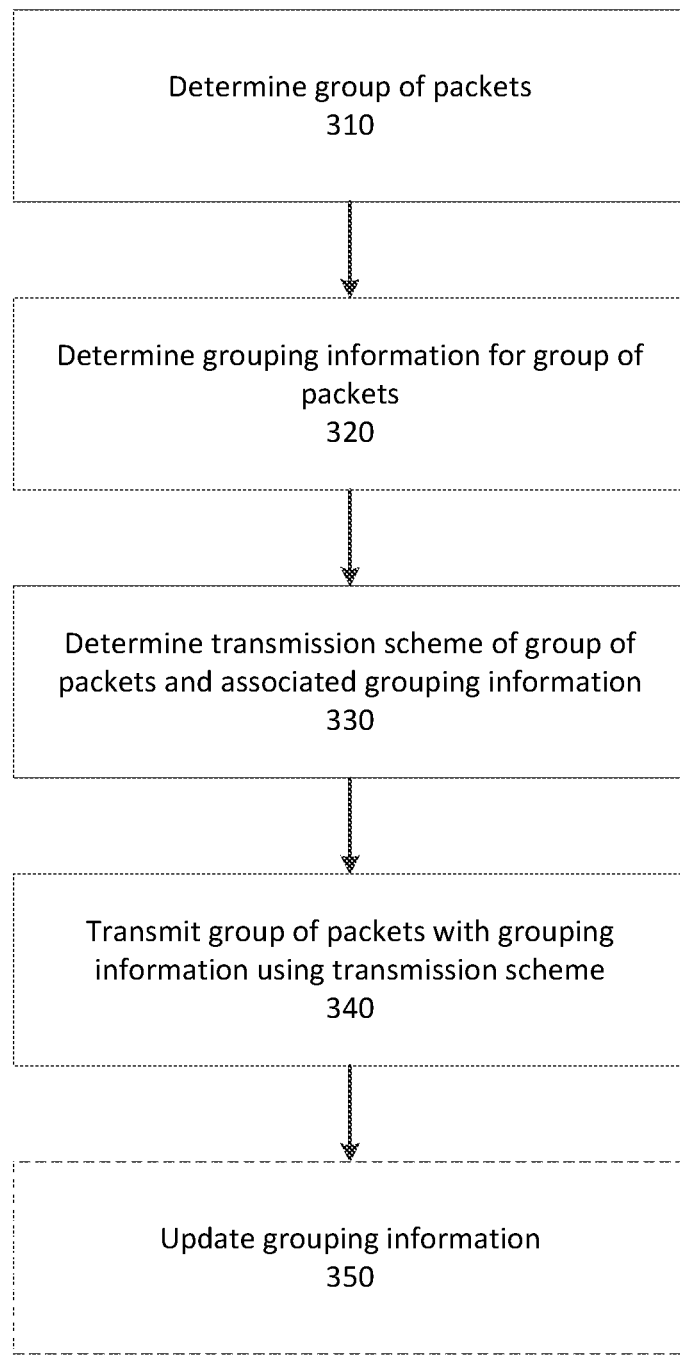
FIG. 3 is a flow diagram depicting an example of a process for grouping and transmitting packets.

FIG. 3 is a flow diagram depicting an example of a process for grouping and transmitting packets.

At block 310, a sender, such as the sender 110, may determine a group of packets. A group may be determined based on any relevant criteria, as described above. For example, a group may be packets comprising a first video frame, such as an iframe of a video.

At block 320, the sender may determine grouping information for the group of packets the sender determined at block 310. Grouping information may be of any form as described herein. For example, grouping information may comprise an identifier to identify packets associated with the group. In an example, grouping information may identify the group of packets comprising the first video frame as "frame1," so that a network device may properly identify each packet of the first video frame. Grouping information may also comprise a threshold that indicates an amount or percentage of packets of the first video frame that need to be received by a receiver in order for the receiver to successfully display the first video frame to a user. Such a threshold may be dependent on the information the packets are carrying. Such a threshold may, for example, be defined as a packet-dropping threshold or, alternatively, as a packet delivery threshold. Using the first video frame example, packets comprising the first video frame may have associated grouping information indicating a threshold amount or percentage of packets of the first video frame that need to be received by a receiver in order for the receiver to successfully display the first video frame to a user. In an example, a video frame may require 90% of its associated packets to be delivered/received to be able to be successfully displayed by a receiver, such as the receiver 140. So, if less than 90% of the packets for the video frame are delivered, the receiver may not be able to reassemble the video frame and present it to a user during playback. In such an example, grouping information associated with the packets may comprise a packet-dropping threshold of 10%, or a delivery threshold of 90%. Such grouping information may also comprise instructions for a router to drop the entire group of packets if the packet-dropping threshold is exceeded or the delivery threshold is not satisfied.

At block 330, the sender may determine a transmission scheme of the group of packets and associated grouping information. For example, the sender may determine to transmit the packets via one or more of the packet types illustrated in FIGS. 2A-C, described above. The sender may also decide how many of the packets may contain grouping information. For example, as described above, the grouping information may be included with only the first packet of the group, every packet of the group, intermittently in packets throughout the group, or any combination thereof. In an example, for the first video frame, each packet may comprise grouping information with identifier "frame1." However, the delivery threshold may only be transmitted in the first packet of the group or every third packet of the group to minimize bandwidth use.

At block 340, the sender may transmit to a receiver the group of packets with the associated grouping information using the transmission scheme determined at block 330. Routers receiving the packets may process and forward them accordingly until the packets are received at the receiver.

Optionally, at block 350, the sender may update the grouping information, as described above. For example, if the grouping information associated with the first video frame comprised an expected packet size and the bandwidth of a connection to the receiver suddenly dropped, the sender may change the transmission scheme of the group of packets by changing the size of each packet. Upon such a change, the sender may send a packet with updated grouping information to inform downstream network devices that the packet size of the group has changed.

A network may include routers capable of utilizing grouping information, which may be referred to as "group-aware" routers, and routers not capable of reading grouping information, which may be referred to as "standard" routers. Standard routers may drop packets based on random selection, as described above, and the dropping of random packets may affect one or more groups traveling through the network.

Figure 4:
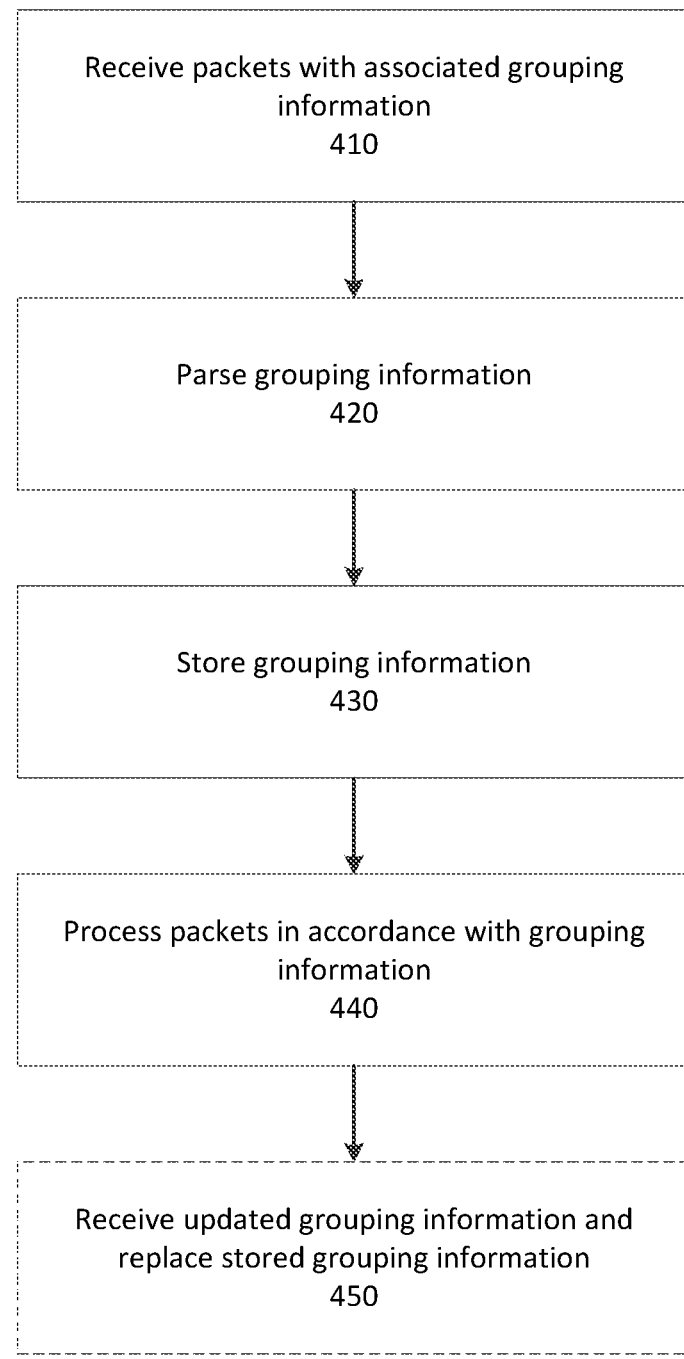
FIG. 4 is a flow diagram depicting an example of a process of a group-aware router analyzing packets with grouping information.

FIG. 4 is a flow diagram depicting an example of a process of a group-aware router analyzing packets with grouping information.

At block 410, a router, such as the router 130, may receive packets with associated grouping information. For example, the router may receive packets of any of the forms shown in the example packets of FIGS. 2A-2C.

At block 420, the router may parse the grouping information of the received packets. The router may determine the data and/or grouping information of the packets using any feasible methods, such as those described with regard to FIGS. 2A-2C, including DPI. For example, the router may parse grouping information associated with packets of a first video frame. The grouping information may identify such packets as having identifier "frame1" and having a maximum packet-dropping threshold of 10% to ensure the video frame may be displayed at a receiver. The grouping information may also comprise instructions for the router to follow if the packet-dropping threshold is exceeded. For example, the instructions may dictate that the router drop all packets of group "frame1" if the 10% threshold is exceeded.

At block 430, the router may store the grouping information parsed from the packets. The grouping information may be stored such that the router may quickly access stored grouping information when receiving packets associated with a group. Storage may be performed using any feasible means. However, such storage should accommodate fast access to quickly process incoming packets. In the example described above, the router may store identifier "frame1," the maximum packet-dropping threshold of 10%, and the instructions to drop all packets of the group if the packet-dropping threshold is exceeded. The router may store the grouping information for any number of groups as long as the router has enough storage capacity to do so.

At block 440, the router may process packets in accordance with grouping information. As the router receives packets, the router may store the associated grouping information and process the packets based on this grouping information, as described herein.

For example, after storing the grouping information for the group of packets comprising "frame1," the router may store and/or calculate a running tally or total of "frame1" packets received to track the number of dropped packets. If the grouping information for group "frame1" comprises a total number of packets comprising the first video frame, then the router may be able to compare this total number of packets to the running tally and determine how many packets were dropped or lost.

In another example, the grouping information for group "frame1" may comprise sequence numbers for each packet comprising the first video frame. The router may check each sequence number to determine lost or dropped packets. For example, the router may store an indication that a packet is missing each time a sequence number is missing to determine a total or running total number of missing packets.

In an example, the router may store each packet in a respective array index or buffer index according to each packet's respective sequence number. The router may then determine which indices are empty to determine the number of packets dropped.

In yet another example, the router may store each group of packets in a hierarchical data structure, such as a tree. By using a hierarchical structure, the router may be able to determine which groups should be dropped before other groups. When determining to drop packets, the router may begin dropping packets of lowest rank in the structure. For example, if a router is instructed to drop packets from groups B and C before dropping packets from group A, the router may create a tree structure with groups B and C being child nodes of group A. When the router determines to drop packets, the router may begin by dropping packets of groups B and C before dropping packets of group A. Such a hierarchical data structure may also be created to provide more complex relationships between groups of packets. For example, if the router has instructions to drop 20% of group B before dropping 10% of group C before dropping the entirety of group A, the router may store 20% of group B's packets on the lowest rank, followed by 10% of group C's packets in the next highest rank, followed by all of group A's packets in the highest rank. Other relationships between packet groups and dropping are discussed herein and may be processed by a router via a hierarchical data structure.

Regardless of method, if the router determines, based on the grouping information, that more packets have been dropped than are allowed the router may perform instructions given by the grouping information. For example, given the instructions associated with the grouping information for group "frame1," the router may determine to drop all packets of the group "frame1." If there are packets of "frame1" currently being processed by the router, the router may drop these packets. As more packets arrive at the router, the router may determine what grouping information each packet has, if any, using any feasible method, such as DPI. If an arriving packet has group identifier "frame1," the router may immediately drop the packet without any further processing. Otherwise, the router may process the arriving packet in accordance with grouping information associated with the packet, if any, or according to default behavior of the router.

Optionally, at block 450, the router may receive updated grouping information and replace the stored grouping information with the updated grouping information. For example, if the grouping information associated with the group "frame1" further comprised an expected packet size, and the bandwidth of a connection to the sender of the group suddenly dropped, the sender may change the transmission scheme of the group of packets by changing the size of each packet. Upon such a change, the sender may send a packet with updated grouping information to inform the router that the packet size of the group has changed. Upon receiving such updated grouping information, the router may store the new packet size of the group "frame1" in place of the previous packet size of the group "frame1." The router may then continue processing the packets of the group "frame1" in accordance with the new grouping information.

Figure 5A:
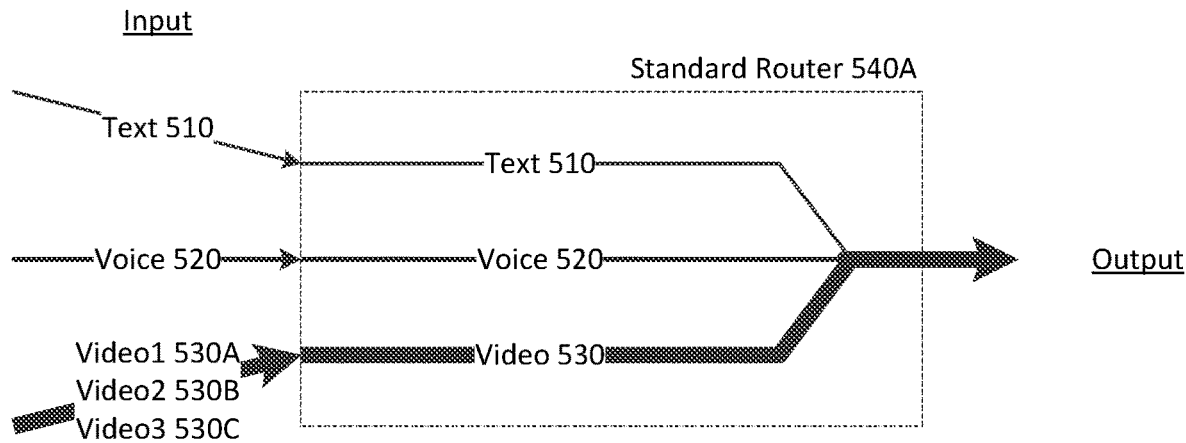
FIG. 5A illustrates a router that is not capable of processing grouping information.

FIG. 5A illustrates processing performed by a router that is a standard router not capable of processing grouping information. The depicted router 540A may be router 130 of FIG. 1 or any other router not capable of processing grouping information. The incoming traffic for the depicted router 540A comprises input streams, each of which has associated grouping information. As shown, the incoming data traffic may comprise: a text stream 510, a voice stream 520, and the video streams video1 530A, video2 530B, and video 3 530C, which collectively comprise the video stream 530. The thickness of each of the incoming data streams is indicative of the relative bandwidth used for each of the streams. Accordingly, the lines collectively representing video stream 530 are wider than the lines representing text stream 510 and thereby reflect that the video stream 530 uses more bandwidth than the text stream 510. In an example scenario, the depicted router 540A is router 130 of FIG. 1, the text stream 510, the voice stream 520, and the video1 stream 530A may arrive from the sender 110 via connection 150, and the video2 stream 530B and the video3 stream 530C may arrive from the router 120 via connection 160. The output of the depicted router 540A may be sent downstream to the receiver 140 via connection 170.

The standard router 540A may only recognize that the video stream 530 is streaming through it without being able to recognize that the video stream 530 is comprised of video streams 530A-C. If the standard router 540A becomes congested and needs to drop packets, it may do so randomly, as described above. Even if the standard router 540A is capable of distinguishing between types of packets, i.e., text 510 from voice 520 from video 530, it may still drop packets from each of the three video streams 530A-C and impact the respective user of each of those streams at the receiver 140.

Figure 5B:
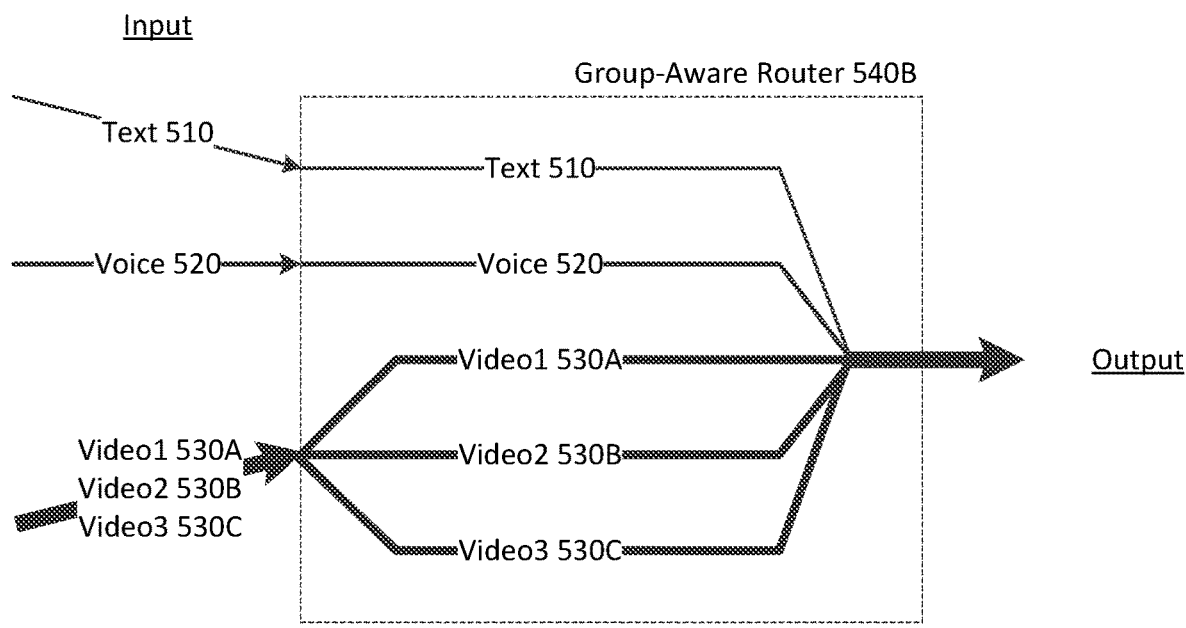
FIG. 5B illustrates a router that is capable of processing grouping information.

FIG. 5B illustrates an example of processing performed by a router that is a group-aware router capable of processing grouping information. The depicted router 540B may be router 130 of FIG. 1 or any other router capable of processing grouping information. The incoming traffic for the depicted router 540B comprises input streams identical to those of FIG. 5A, each of which has associated grouping information. As shown, the incoming data traffic may comprise: a text stream 510, a voice stream 520, and the video streams video1 530A, video2 530B, and video 3 530C, which collectively comprise the video stream 530. As in FIG. 5A, the thickness of each of the incoming data streams is indicative of the relative bandwidth used for each of the streams. In an example scenario, the depicted router 540B is router 130 of FIG. 1, the text stream 510, the voice stream 520, and the video1 stream 530A may arrive from the sender 110 via connection 150, and the video2 stream 530B and the video3 stream 530C may arrive from the router 120 via connection 160. The output of the depicted router 540B may be sent downstream to the receiver 140 via connection 170. The group-aware router 540B may operate in accordance with embodiments disclosed herein and recognize the separate video streams 530A-C. If the group-aware router 540B becomes congested and needs to drop packets from one or more video streams, the group-aware router 540B may do so without impacting the respective user of each of the video streams 530A-C.

Figure 6A:
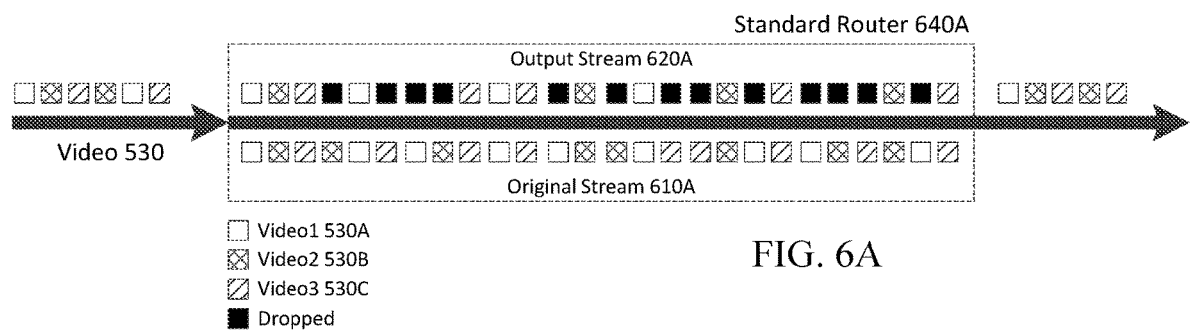
FIG. 6A illustrates a processing scheme of a router dropping packets in response to congestion.
Figure 6B:
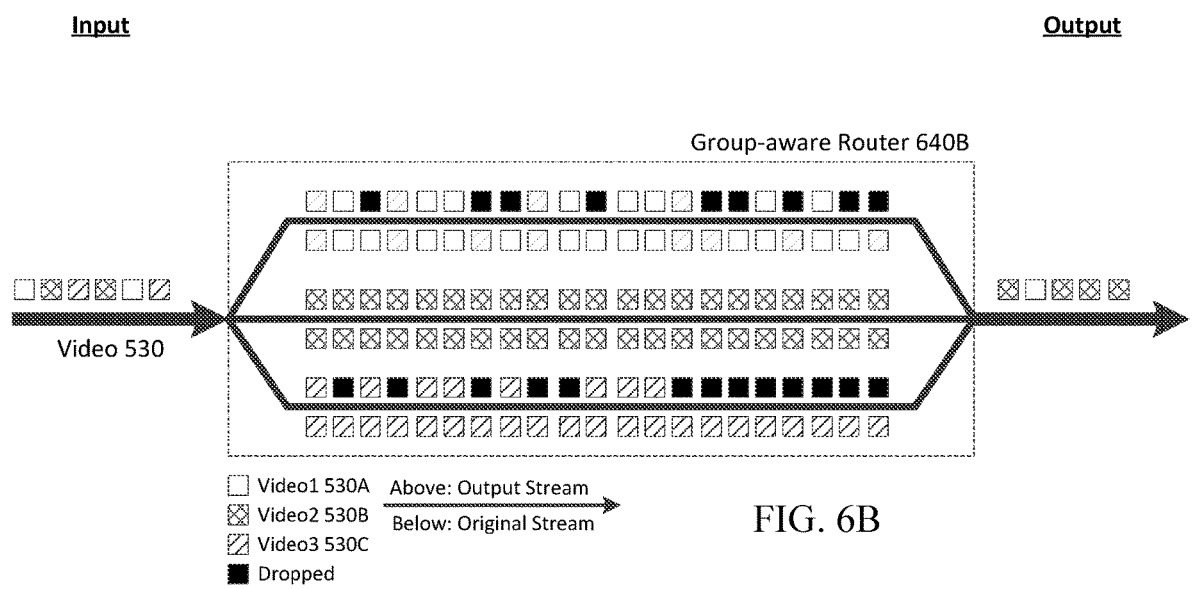
FIG. 6B illustrates a processing scheme of a group-aware router dropping packets in response to congestion.

FIGS. 6A and 6B illustrate examples of network traffic being dropped by the corresponding routers 540A and 540B of FIGS. 5A-B. FIG. 6A illustrates the processing scheme of a standard router 640A dropping packets. FIG. 6B illustrates the processing scheme of a group-aware router 640B dropping packets. In the examples illustrated in FIG. 6A and FIG. 6B, the depicted router 640A/B is congested and has determined to drop video stream packets, allowing the text stream 510 and the voice stream 520 to stay intact. For purposes of example, the grouping information associated with the video1 stream 530A indicates that no more than two consecutive packets may be dropped. Further, for purpose of example, the grouping information associated with the video2 stream 530B and the video3 stream 530C indicates that the video3 stream 530C should be dropped before the video2 stream 530B. The packets of each stream are represented by squares and distinguished from one another by pattern. The video1 stream 530A is represented by white squares, the video2 stream 530B is represented as cross-hatched squares, and the video3 stream 530C is represented as striped squares. Dropped packets are represented by black squares.

FIG. 6A illustrates the processing scheme of a standard router 640A dropping packets in response to congestion. Because the standard router 640A cannot recognize grouping information, all packets are processed equally. Thus, the video streams 530A-C are input and processed as a single video stream 530, represented as a heavily-weighted arrow. The video packets of video stream 530 may enter the standard router 640A in the order they arrive. As shown in FIG. 6A, the example sequence of packets above the line comprise the conglomerate input stream "Video 530." Because the standard router 640A is not a group-aware router, it drops packets randomly to alleviate congestion and outputs the remaining packets. In FIG. 6A, the dropped packets are identified in the output stream 620A, shown above the line inside the standard router 640A, and the original stream 610A is depicted below the line for comparison. Instead of outputting the original stream 610A, or favoring video2 stream 530B over video3 stream 530C as their grouping information indicates, the standard router 640A outputs the output stream 620A, which has packets dropped from all three video streams 530A-C. The dropped packets likely affect the user experience for the respective user of each of the video streams 530A-C.

FIG. 6B illustrates the processing scheme of a group-aware router 640B dropping packets in response to congestion. As the group-aware router 640B receives packets containing grouping information, it keeps track of each group separately, as shown by the three separate lines in FIG. 6B. While FIG. 6B depicts these three groups as being processed separately in parallel, the depiction is for purposes of example only and should not be construed as limiting. Some embodiments may allow a group-aware router 640B to process packet groups in parallel. Other embodiments may allow a group-aware router 640B to process packets sequentially, similar to that shown in FIG. 6A, while keeping a record of which packets belong to which group.

In FIG. 6B, the original input streams are displayed under each line for comparison to the output stream, displayed above each line. The grouping information for video1 stream 530A indicates that no more than two consecutive packets should be dropped from the stream. The group-aware router 640B processes that group information and drops a maximum of two consecutive packets from the video1 stream 530A, as shown by the packets surrounding the top line inside the group-aware router 640B. The grouping information for video2 stream 530B and video3 stream 530C indicates that packets of video3 stream 530C should be dropped before dropping packets of video2 stream 530B. Thus, the group-aware router 640B drops some packets of the video3 stream 530C, as shown by the packets surrounding the bottom line inside the group-aware router 640B. The group-aware router 640B does not drop any packets of the video2 stream 530B, as shown by the packets surrounding the middle line inside the group-aware router 640B, because the dropping of packets of both the video1 stream 530A and the video3 stream 530C decongest the group-aware router 640B enough to allow all packets of the video2 stream 530B to pass. Therefore, the output of the group-aware router 640B will consist mostly of packets of the video2 stream 530B and the video1 stream 530A.

Figure 7:
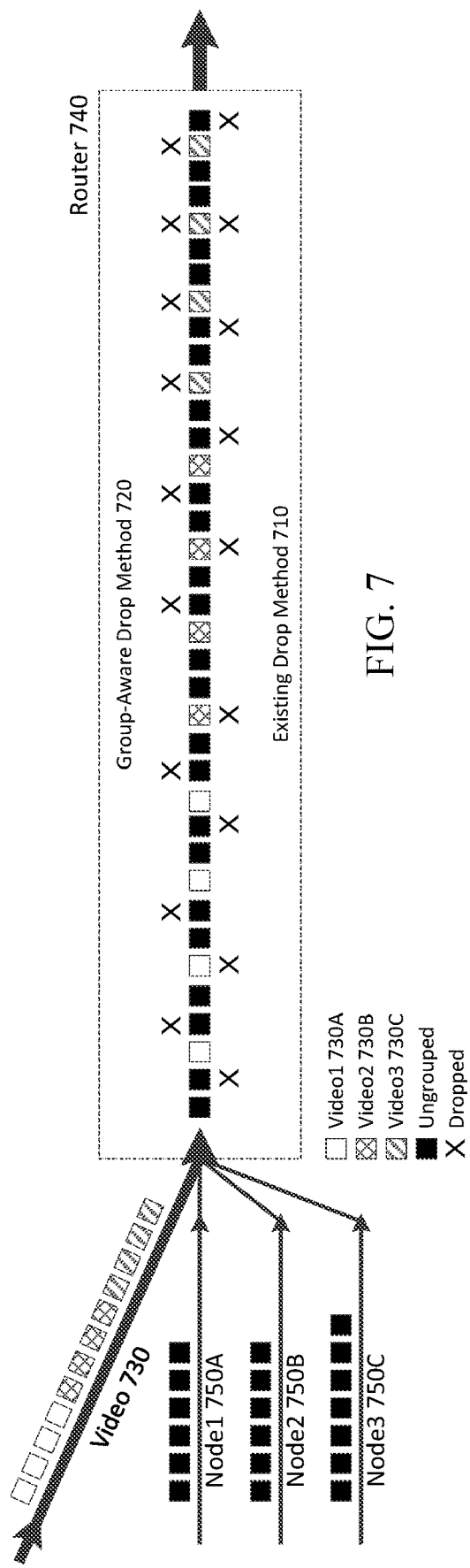
FIG. 7 illustrates an example of the processing of identical network traffic by a group-aware router versus an existing router.

FIG. 7 illustrates an example of the processing of identical network traffic by a group-aware router versus an existing router. In the example illustrated in FIG. 7, the depicted router 740 is congested and has determined to drop packets. The streams of packets entering the router are a node1 stream 750A, a node2 stream 750B, a node3 stream 750C and a video stream 730 comprising a video1 stream 730A, a video2 stream 730B, and a video3 stream 730C. For purposes of example, the packets of streams node1, node2, and node3 do not include grouping information. The grouping information associated with the video1 stream 730A indicates that no more than two consecutive packets may be dropped, and the grouping information associated with the video2 stream 730B and the video3 stream 730C indicates that the video3 stream 730C should be dropped before the video2 stream 730B. The packets of each stream are represented by squares and distinguished from one another by pattern. The video1 stream 730A is represented by white squares, the video2 stream 730B is represented as cross-hatched squares, and the video3 stream 730C is represented as striped squares. Ungrouped packets are represented by black squares.

In FIG. 7, the 'x' marks indicate a position where a packet would be dropped. An 'x' below a packet indicates where a packet may be dropped under an existing drop method 710, such as random dropping. In this example, the existing drop method 710 drops at least one packet from each group as well as random packets that are ungrouped, which may impact the quality or usefulness of each stream to an end user. An 'x' above a packet indicates where a packet may be dropped using a group-aware drop method 720. In this example, the group-aware drop method 720 is able to preserve all of the video1 stream 730A packets. The group-aware drop method 720 is also able to preserve all of the video2 stream 730B packets. However, in according with the grouping information associated with the video2 stream 730B and the video3 stream 730C, which indicates that the video3 stream 730C packets should be dropped before dropping any of the video2 stream 730B packets, the group-aware drop method 720 drops all of the packets associated with the video3 stream 730C.

Figure 8:
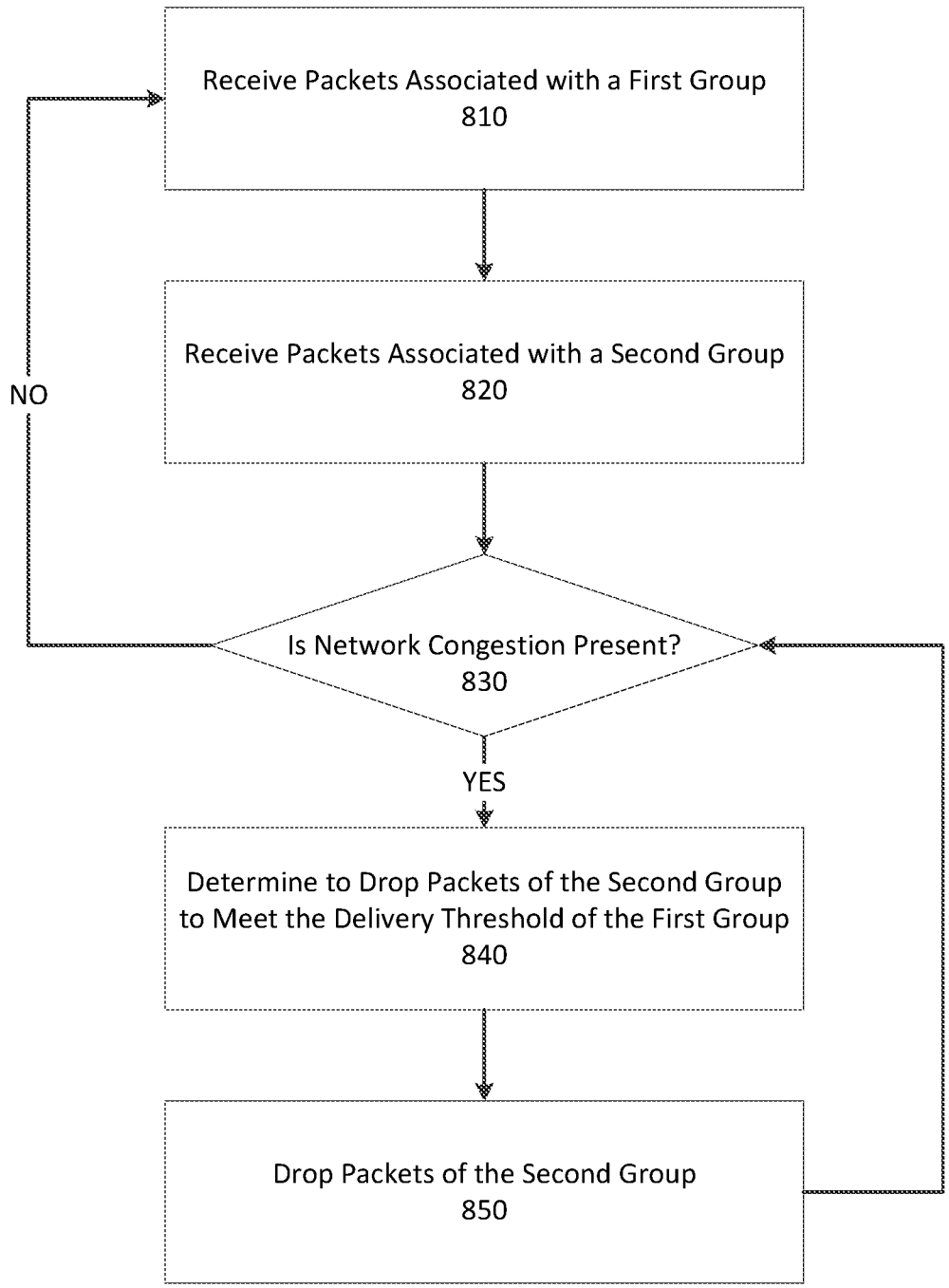
FIG. 8 is a flow diagram depicting an example process for selectively dropping packets of a group.

FIG. 8 is a flow diagram depicting an example of a process for dropping packets of one group to allow another group to meet its delivery threshold.

At block 810, a router, such as the router 130, receives packets associated with a first group. The first group may have grouping information identifying the first group and indicating a delivery threshold for the first group. For example, the grouping information may indicate to the router that the first group is a video stream identified as Video1 and requires 95% delivery of the packets in the first group.

At block 820, the router may receive packets associated with a second group. The second group may have grouping information identifying the second group and indicating a delivery threshold or other instructions for the second group. For example, the grouping information may indicate to the router that the second group contains web content, is identified as Web1, and requires 80% delivery of the packets in the second group. In other examples, the grouping information may not indicate a delivery threshold for the second group, or the grouping information may indicate that the second group is dependent on the first group, as shown above with respect to streams video2 and video3 of FIGS. 6A-B. In examples, based on the grouping information, the router may process and store packets in a data structure to facilitate efficient dropping. For example, the router may store 20% of the packets of the second group as a lower rank than 5% of the packets of the first group in a hierarchical data structure, such as a tree, as described above with respect to FIG. 4.

At decision block 830, the router may determine if network congestion is present. The router may determine it is congested by, for example, determining that the amount of input it is receiving exceeds its available output capability. The router's output capability may be determined per-network link and using any suitable data structure, such as a queue. By determining the amount of input the router has and determining how many packets need to be output, the router may be able to anticipate congestion a short time in the future, e.g., 0-20 milliseconds. If the router determines that it is not congested, then it need not drop any packets and processing may begin again at block 810. However, if the router determines that it is congested, or will soon be congested, it may determine to drop packets to relieve the congestion.

At block 840, the router is congested and determines to drop packets of the second group to meet the delivery threshold of the first group. For example, using the above example grouping information, the router may determine that more packets of the second group may be dropped than the first group because the second group has a lower delivery threshold (80%) than the first group (95%). The router may make such a determination based on a data structure the packets of the groups are stored in and process in. For example, using the tree structure described above, the router may determine that the packets of the second group are of a lower rank than the packets of the first group and decide to drop packets of the second group before dropping packets of the first group.

At block 850, after the router determines to drop packets of the second group at block 840, the router may then drop those packets and decongest itself enough to allow the first group to pass and meet the delivery threshold set forth in the first group's grouping information. Packets may be dropped by any feasible method, and may be dropped in mass, individually, or a combination of both. For example, the router may drop some or all of the packets of the second group that the router is currently processing. The router may then drop each packet of the second group that the router receives until the delivery threshold of the first group is met. In other examples, the router may only perform a single drop of packets of the second group it is currently processing or drop only packets of the second group that continue to be received. After the router meets the delivery threshold of the first group, the router may return to block 830 to determine if congestion is present and determine if more packets need to be dropped. The router may determine that it has enough bandwidth to allow both groups to meet their delivery thresholds after dropping up to 20% of the second group and up to 5% of the first group. Alternatively, the router may determine that it cannot meet both delivery thresholds and may drop the entire second group to allow the first group to be delivered.

Grouping information and group-aware routers may identify dropping performed by upstream routers, both standard and group-aware. For example, grouping information may include sequence numbers with each packet of a group, which may be different than those utilized in networking protocols such as TCP, or the grouping information may indicate that the group is utilizing sequence numbers of the networking protocol it is using. The group-aware router may determine a packet was dropped by an upstream router when numbers in the sequence are missing or skipped. For example, a group-aware router may determine that a packet has been dropped by an upstream router when the group-aware router consecutively processes sequence numbers 1 and 5 without processing sequence numbers 2-4. In another non-limiting example, grouping information may include an array or map of packets in the group. If a packet is dropped, the reference contained in the array or map that originally pointed to that packet will no longer point to that packet. Thus, if a group-aware router cannot find a packet in the array or map, it determines that the packet was dropped by an upstream router and may act accordingly. For example, if the group-aware router determines that an iframe is missing from a video stream, it may drop all differential data associated with that iframe. Regardless of the method of recognizing dropped packets, a group-aware router may keep a running count of how many packets have been dropped from a group to calculate the group's drop percentage. Once the drop number or percentage is determined, the group-aware router determines if the dropping threshold has been reached and whether or not it will need to act in accordance with any programming logic contained in the grouping information, e.g., drop the entire group, or a subset of the group.

A group-aware router may also send a group's current drop percentage to the next downstream router that will process the group. If the next downstream router is a group-aware router, it will already be able to determine how close the group is to the group's dropping threshold.

Group-aware routers may learn of other routers in the network via any available method, such as utilizing a network topology map, receiving notifications from the other routers, and sending requests to and receiving responses from the other routers in the network, among other methods. A new group-aware protocol may also be introduced wherein a group-aware router may query another router over this new protocol, and if the group-aware router does not receive a response, it may assume the router is not group-aware. This new protocol may be implemented by running a service on each group-aware router that responds to a specific packet; if the service is running, the router will respond, indicating that it is group-aware; if the service is not running, the router will not respond, indicating to the sending router that it is not group-aware. Further, a sender might include network information, including notice of other routers in the network, as part of grouping information, allowing a group-aware router to determine that other standard and/or group-aware routers exist in the network or data path. Group-aware routers that are aware of each other may share grouping logic and work together to optimize delivery and avoid congestion. If a network path comprises group-aware routers, then none of the group-aware routers will need to anticipate that standard routers on the network path will not act in accordance with the grouping information.

If standard routers do exist in the network path, group-aware routers may anticipate packet dropping performed by downstream routers by not dropping all of the packets a delivery threshold allows for. For example, a group-aware router may determine from the destination address that it is not the final router before the receiver and thus assume that more packets will be dropped before delivery to the receiver. The group-aware router may intelligently drop packets so that if further dropping occurs, either randomly or via group-aware routers, groups may still be capable of delivery. For example, referring to the example network 106 of FIG. 1, if a first group with a 95% threshold is received at router 120, and a second group with an 80% threshold is received at router 120, the group-aware router 120 may determine that router 130 may still need to process, and possibly drop, packets from the first group and the second group before delivery to the receiver 140. Thus, the group-aware router 120 may drop some packets of both groups, but not drop enough to meet the threshold of either group. Note that the router 120 may drop more packets of the second group in case more packets of the first group get dropped downstream because the second group has a lower delivery threshold.

Group-aware routers and destinations may notify a group's sender if packets of the group are dropped to avoid further network congestion and waste associated with retransmissions. In some existing networking protocols, such as TCP, a sender may automatically retransmit data if receipt of sent data is not acknowledged, and protocol retransmission may or may not have an associated back-off algorithm that delays retransmission based upon previous transmission successes. This notification may include a time-delay for retransmission so that the sender does not immediately retransmit the group data and further congest the network. When the sender receives the notification and chooses to retransmit the data, it may resend the group, resend the group after a time-delay if one was given, or, if it contains information about the network topology, may resend the group through a different network path in hopes that the different path is less-congested. If a sender determines, either from the routers in the network path or any other feasible method, that the network is still congested when the sender is ready to resend the data, it may resend the data at a lower quality that is still useful to the user. For example, the sender may resend a video at a lower bitrate so that at minimum the user may still view the video. Resent data may have associated grouping information that indicates to group-aware routers that it is resent, and after resending, group-aware routers may treat the resent traffic with a higher priority and be less likely to drop it because the data is being resent in response to congested network conditions. Network topology may be found by any known method in the art, such as the reception of a network topology map, network mapping, etc. The programming logic instructions to notify a group's sender, including a possible time-delay, may be included in the grouping information associated with the group or may be built-in to the group-aware router's programming.

Similarly, by receiving acknowledgements from the destination, a group-aware router may determine how many packets were dropped by routers after the group-aware router sent the packets. Such a metric may help the group-aware router determine how badly other routers in the network path are congested and make more intelligent decisions when dropping packets in the near future. For example, the group-aware router may unnecessarily drop traffic, but do so intelligently to ease congestion further down the network path. Dropping packets early may help avoid the dropping of random packets by a standard router closer to the destination. In another example, the group-aware router may determine that an important piece of data has been dropped, such as an iframe, and packets associated or dependent upon that data, such as differential data, may now be dropped because they are useless to the consumer.

Figure 9:
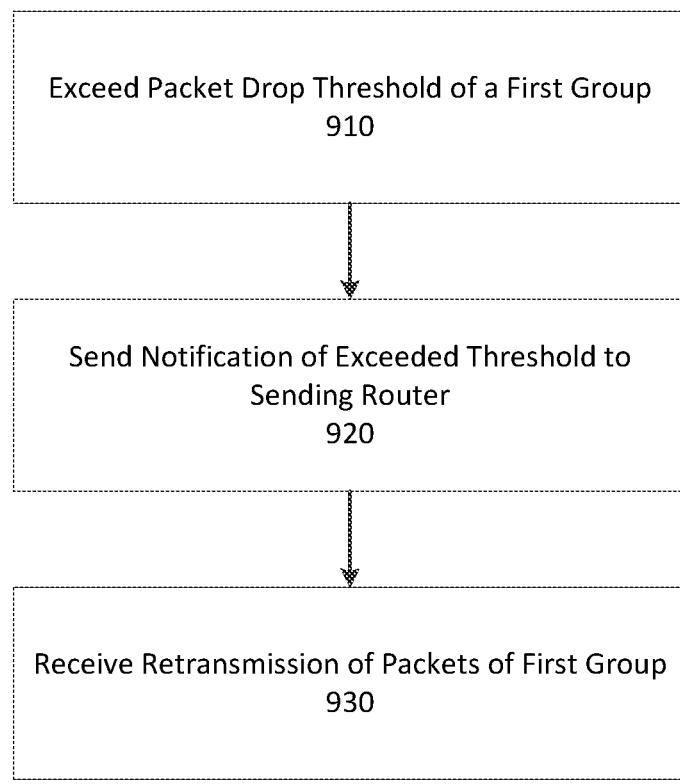
FIG. 9 is a flow diagram depicting an example process for upstream notification of dropped packets.

FIG. 9 is a flow diagram depicting an example process for upstream notification of a drop after the drop has occurred.

At block 910, a router, such as the router 130, after having dropped packets associated with a first group or receiving information indicating packets associated with the first group have been dropped, determines that a dropping threshold associated with the first group has been exceeded. The router may determine that, because the threshold has been exceeded, the data of the first group may not be adequate for delivery to the end user.

At block 920, the router may send a notification to a sender, such as the sender 110, that the packet-dropping threshold of the first group has been exceeded. Additionally, but not pictured in FIG. 9, the router may also send a notification to the destination that the packet-dropping threshold of the first group has been exceeded. This way, the destination may delay or limit further requests from the network if the application requesting the data warrants such an action. The notification to the sender may include a time-delay that tells the sender how long to wait before resending the first group. The instructions to send the notification to the sender may be included in the grouping information associated with the first group or inherent in the programming of the router. The sender may receive this notification and may resend the group immediately, resend the group after the time-delay if one was given, or, if the sender contains information about the network topology, may resend the group through a different network path. In the example network 106 of FIG. 1, the sender 110 does not have a separate network path to resend the first group through, so the sender 110 may resend the first group through connection 150 to the router 130 for delivery at the receiver 140 via connection 170.

At block 930, the router may receive the retransmitted packets of the first group and processes them in accordance with the embodiments described herein. If the router again exceeds the packet-dropping threshold of the retransmitted first group, the process illustrated in FIG. 9 may begin again. In such a case, the router may send a longer time-delay to the sender along with the second notification that the threshold was exceeded.

Figure 10:
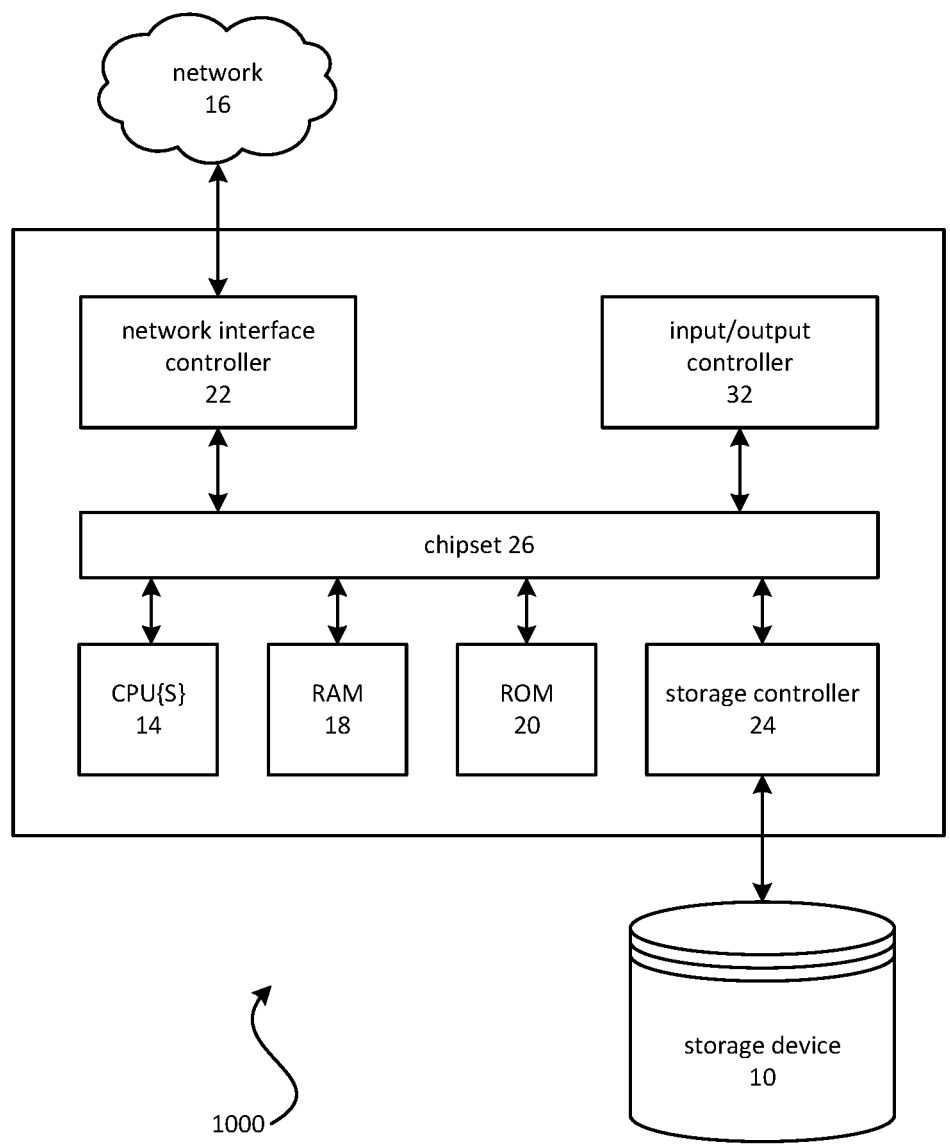
FIG. 10 depicts an example computing system.

FIG. 10 depicts a computing device that may be used in various components, such as any of the various devices depicted in FIG. 1. The computer architecture shown in FIG. 10 may correspond to a set-top box, remote control device, home automation system, desktop computer, laptop, tablet, network appliance, e-reader, smartphone, the sender 110, the router 120, the router 130, the receiver 140, a group-aware router, a standard router, or other computing device, and may be utilized to execute any aspects of the computers described herein, such as to implement the operating procedures of FIGS. 5A-B, 6A-B, and 4-7.

A computing device 1000 may include a baseboard, or "motherboard," which is a printed circuit board to which a multitude of components or devices may be connected by way of a system bus or other electrical communication paths. One or more central processing units ("CPUs") 14 may operate in conjunction with a chipset 26. The CPU(s) 14 may be standard programmable processors that perform arithmetic and logical operations necessary for the operation of the computing device 1000.

The CPU(s) 14 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 14 may, in various embodiments, be augmented with or replaced by other processing units, such as GPU(s) (not shown). GPU(s) may comprise processing units specialized for, but not necessarily limited to, highly parallel computations, such as graphics and other visualization-related processing.

A chipset 26 may provide an interface between the CPU(s) 14 and the remainder of the components and devices on the baseboard. The chipset 26 may provide an interface to a random access memory ("RAM") 18 used as the main memory in the computing device 1000. The chipset 26 may further provide an interface to a computer-readable storage medium, such as a read-only memory ("ROM") 20 or non-volatile RAM ("NVRAM") (not shown), for storing basic routines that may help to start up the computing device 1000 and to transfer information between the various components and devices. The ROM 20 or NVRAM may also store other software components necessary for the operation of the computing device 1000 in accordance with the aspects described herein.

The computing device 1000 may operate in a networked environment using logical connections to remote computing nodes and computer systems through a local area network ("LAN") 16. The chipset 26 may include functionality for providing network connectivity through a network interface controller (NIC) 22, such as a gigabit Ethernet adapter. The NIC 22 may be capable of connecting the computing device 400 to other computing nodes over the network 16. It should be appreciated that multiple NICs 22 may be present in the computing device 1000, connecting the computing device to other types of networks and remote computer systems.

The computing device 1000 may be connected to a mass storage device 10 that provides non-volatile storage for the computing device 1000. The mass storage device 10 may store system programs, application programs, other program modules, and data, used to implement the processes and systems described in greater detail herein. The mass storage device 10 may be connected to computing device 1000 through a storage controller 24 connected to the chipset 26. The mass storage device 10 may consist of one or more physical storage units. A storage controller 24 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1000 may store data on the mass storage device 10 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 10 is characterized as primary or secondary storage and the like.

For example, the computing device 1000 may store information to the mass storage device 10 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 10 by detecting the physical states or characteristics of one or more particular locations within the physical storage units.

In addition to the mass storage device 10 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 10 may store an operating system utilized to control the operation of the computing device 1000. For example, the operating system may comprise a version of the LINUX operating system. In another example, the operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 10 may store other system or application programs and data utilized by the computing device 1000.

The mass storage device 10 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 14 transition between states, as described above. The computing device 1000 may have access to computer-readable storage media storing computer-executable instructions, which, when executed by the computing device 1000, may perform operating procedures depicted in FIGS. 5A-B, 6A-B, and 4-7.

The computing device 1000 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing node may be a physical computing device, such as the computing device 1000 of FIG. 10. A computing node may also include a virtual machine host process and one or more virtual machine instances operating on a physical computing device, such as the computing device 1000. Computer-executable instructions may be executed by the physical hardware of a computing device indirectly through interpretation and/or execution of instructions stored and executed in the context of a virtual machine.

Applicant has described methods and systems for network based control of wireless gateway communications. It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the described methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the aforementioned detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the disclosed embodiments may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described. It is intended that the specification and example figures be considered as exemplary only, with a true scope and spirit being indicated by the following claims.

What is claimed:

1. A method, comprising:
   receiving a first group of packets representing a first video frame, the first group of packets associated with first grouping information and information indicating a maximum number of packets of the first group that can be dropped;
   receiving a second group of packets representing a second video frame;
   determining that the packets of the first group and the packets of the second group exceed a capability; and
   determining, based on determining that the packets of the first group and the packets of the second group exceed the capability, to drop at least one of the packets of the first group and at least one of the packets of the second group such that the maximum number of packets of the first group that can be dropped is not exceeded.

2. The method of claim 1, wherein determining to drop at least one of the packets of the second group comprises determining to drop all of the packets of the second group.

3. The method of claim 1,
   wherein the second group of packets is associated with second grouping information and information indicating a second threshold value for delivery of the packets of the second group, and
   wherein determining to drop at least one of the packets of the second group comprises:
      determining to drop at least one of the packets of the second group so that the second threshold value for delivery of packets of the second group is satisfied.

4. The method of claim 1,
   wherein the second group of packets is associated with second grouping information and information indicating a second threshold value for delivery of the packets of the second group, and
   wherein determining to drop at least one of the packets of the second group comprises:
      determining that the second threshold value for delivery of packets of the second group is not satisfied; and
      determining, based on determining that the second threshold value for delivery of packets of the second group is not satisfied, to drop all of the packets of the second group.

5. The method of claim 1, wherein the first group of packets is further associated with instructions to be performed if the maximum number of packets of the first group that can be dropped is exceeded.

6. The method of claim 5, wherein the instructions to be performed comprise dropping all of the packets of the first group.

7. The method of claim 5, wherein the instructions to be performed comprise sending a notification to at least one of a sender of the first group of packets or a receiver of the first group of packets.

8. A method comprising:
   receiving a first group of packets representing a first video frame, the first group of packets associated with first grouping information and information indicating a maximum number of packets of the first group that can be dropped;
   storing the first grouping information;
   receiving a second group of packets representing a second video frame, the second group of packets associated with second grouping information;
   storing the second grouping information;
   determining that the packets of the first group and the packets of the second group exceed a capability; and
   determining, based on determining that the packets of the first group and the packets of the second group exceed the capability, to drop more than the maximum number of packets of the first group that can be dropped.

9. The method of claim 8, further comprising:
   receiving retransmitted packets representing the first video frame.

10. The method of claim 8, wherein the first group of packets is further associated with instructions to be performed if the maximum number of packets of the first group that can be dropped is exceeded.

11. The method of claim 8, further comprising:
    sending a notification that the maximum number of packets of the first group that can be dropped has been exceeded.

12. A method comprising:
    receiving first grouping information associated with a first group of packets, the first grouping information comprising a first group identifier, a first maximum number of packets that may be dropped from the first group of packets, and instructions for actions to be performed if more than the first maximum number of packets is dropped;
    receiving the first group of packets;
    determining that the packets of the first group of packets exceed a capability;
    dropping, based on determining that the packets of the first group exceed the capability, at least one packet of the first group of packets;
    determining an indication of the number of the at least one dropped packets of the first group;
    determining, that the number of the at least one dropped packets of the first group of packets exceeds the first maximum number of packets that may be dropped; and
    executing, based on determining that the number of the at least one dropped packets of the first group of packets exceeds the first maximum number of packets that may be dropped, the instructions of the first grouping information.

13. The method of claim 12, wherein the instructions comprise instructions to drop all of the packets of the first group.

14. The method of claim 12, wherein determining that the packets of the first group of packets exceed the capability comprises determining that network congestion is present.

15. The method of claim 12, further comprising:
    receiving second grouping information associated with a second group of packets, the second grouping information comprising a second group identifier, a second maximum number of packets that may be dropped from the second group of packets, and instructions for actions to be performed if more than the second maximum number of packets is dropped;
    receiving the second group of packets; and before dropping the at least one packet of the first group of packets, dropping at least one packet of the second group of packets to avoid dropping more than the first maximum number of packets of the first group of packets.

16. The method of claim 15, wherein dropping the at least one packet of the second group comprises dropping all packets of the second group to avoid dropping more than the first maximum number of packets of the first group.

17. The method of claim 15, wherein dropping the at least one packet of the second group comprises dropping packets of the first group and packets of the second group to avoid dropping more than the first maximum number of packets of the first group and to avoid dropping more than the second maximum number of packets of the second group.

18. The method of claim 1, wherein the capability is at least one of a bandwidth capability or a delivery capability.

19. The method of claim 8, wherein the capability is at least one of a bandwidth capability or a delivery capability.

20. The method of claim 12, wherein the capability is at least one of a bandwidth capability or a delivery capability.

21. The method of claim 12, further comprising receiving a second group of packets,
wherein dropping the at least one packet of the first group of packets comprises dropping at least one packet of the first group of packets and at least one packet from the second group of packets.

22. The method of claim 1, wherein the first grouping information and the information indicating the maximum number of packets of the first group that can be dropped is received in one or more packets of the first group of packets.

23. The method of claim 8, wherein the first grouping information and the information indicating the maximum number of packets of the first group that can be dropped is received in one or more packets of the first group of packets.

24. The method of claim 1, wherein the first grouping information is received in one or more packets of the first group of packets.

* * * * *